(No Model.)
E. M. BYRKIT.
DOVETAILING MACHINE.
No. 335,335. Patented Feb. 2, 1886.
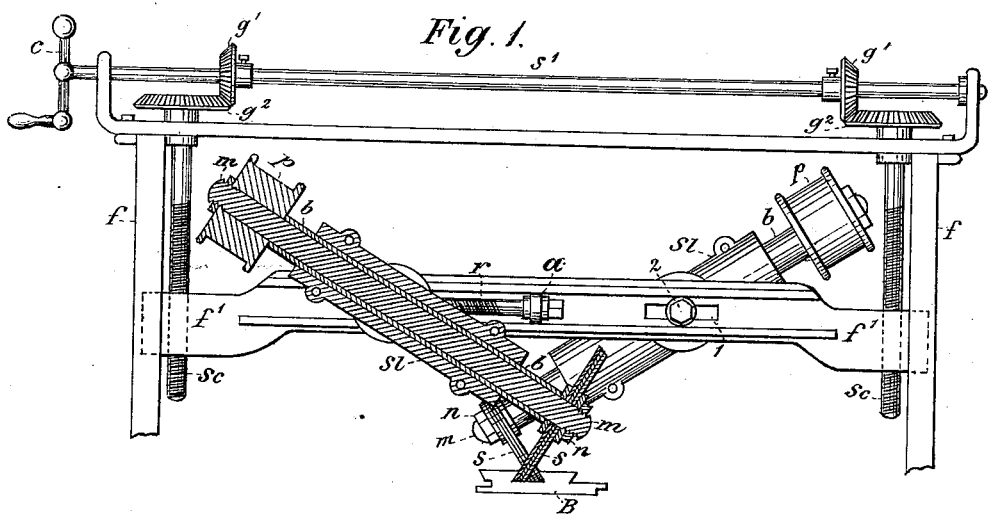
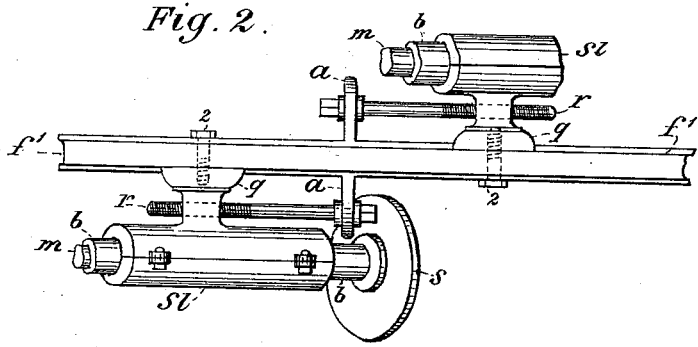
WITNESSES.
Gustav Bohn.
William E. Barton.
INVENTOR.
Edwin M. Byrkit.
By C. P. Jacobs
Atty.

United States Patent Office.

EDWIN M. BYRKIT, OF INDIANAPOLIS, INDIANA, ASSIGNOR OF ONE-HALF TO JOHN H. MURRY AND ADDISON A. ADAIR, BOTH OF SAME PLACE.

DOVETAILING-MACHINE.

SPECIFICATION forming part of Letters Patent No. 335,335, dated February 2, 1886.

Application filed August 10, 1885. Serial No. 173,956. (No model.)

*To all whom it may concern:*

Be it known that I, EDWIN M. BYRKIT, a resident of Indianapolis, Indiana, have made certain new and useful Improvements in Sheathing and Lath Machines, a description of which is set forth in the following specification, reference being made to the accompanying drawings, in the several figures of which like letters indicate like parts.

My invention relates to an improvement in machines for cutting the dovetailed grooves in boards designed for sheathing and lath, like that described in the Letters Patent issued to me March 24, 1885, and will be understood from the following description.

In the drawings, Figure 1 is an end view of my device, partly in horizontal section; and Fig. 2 is a top view of a portion of the same, showing the relative position of the mandrels that carry the saws.

In detail, $ff$ are the uprights of the frame that carries the mechanism, the top portion of which provides bearings for a small shaft, $s'$, having a crank, $c$, at one end and smaller gear-wheels, $g'$, mounted thereon near each end.

$sc$ are screw-rods, on the top of which are mounted gear-wheels $g^2$, adapted to mesh with those mounted on the shaft $s'$. The lower portion of these screw-rods is threaded to work in threaded openings in the cross-piece $f'$, and by turning the crank $c$ these screw-rods are revolved, and the cross-piece $f'$, carrying the saw mechanism, may be either raised or lowered, as desired.

$m$ are mandrels, on the upper ends of which are mounted driving-pulleys $p$, and below these pulleys is the horizontal boxing $b$, confined in the sleeve $sl$, which is formed in two halves which are secured together by means of threaded bolts, as shown in Fig. 2. On the lower end of these mandrels are mounted small circular saws $s$, several on each mandrel, the saws being of slightly different diameters, so that the outer edges will form a bevel, as shown in Fig. 1. The sleeve $sl$ has on its under side a projection, $q$, through the stem of which is a threaded opening to receive the screw-rod $r$, the opposite end of which is supported in a bearing in a projection, $a$, connected with the cross-piece $f'$. The lower part of the projection $q$ rests against the side of the cross-piece $f$, and a slot, 1, is cut through to admit the passage of a bolt or screw, 2, which enters into the base of the projection $q$. By loosening this screw 2 and turning the screw-rod $r$ it is obvious that the sleeve $sl$, with its mandrel and saw, may be adjusted horizontally within the limits of the length of the slot 1, the object of this being to allow the separation of the saws from each other in a horizontal plane, and thus to regulate the width of the dovetailed groove they will cut when in operation. It will be observed that the boxing $b$ extends the entire length of the mandrel between the driving-pulleys, and that this boxing is inclosed in the sleeve $sl$, which is formed in two halves screwed together, as hereinbefore described, and by tightening these screws this sleeve tightly clamps the boxing $b$, and as it often happens that one set of saws will wear away faster than the other, either by reason of their differing in diameter or one having more to cut than the other, by loosening the clamp-screws of the sleeve the boxing $b$ with its mandrel and saws mounted thereon may be adjusted along the line of the length of the sleeve, so that the saws mounted on such mandrel may be made to cut evenly with the saws upon the opposite one, and this adjustment when made is secured by again tightening the screws of the sleeve $sl$, causing the parts to firmly clamp the boxing and hold it securely in place and preventing its slipping in any direction. This mandrel is described in this application only for the purpose of showing its relation to the other mechanism of the machine for grooving lumber, and no separate claim is made therefor. A separate application for Letters Patent upon the mandrel is pending in the office contemporaneously with this case.

B represents a board of sheathing in which the desired dovetailed groove is intended to be cut, and, as it will be seen, the saws and their mandrels being placed on opposite sides of the cross-piece $f'$, will not interfere with each other when in operation, inasmuch as one is ahead of the other.

The frame $f$ with its mechanism is adapted to any flooring-machine, and belts from the main driving-pulleys of such a machine are intended, by crossing, to be passed over the pulleys $p$ of the machine, herein described, to drive it.

The sleeve $sl$ with its mandrel and boxing is set upon the rod $r$ at an angle of about thirty degrees, and when thus set it preserves this said angle fixedly during the operation of the machine, and when these saws and mandrels have been adjusted at the proper point by means of the rod $r$ and its screw, which passes through the neck of the projection $q$, the screw-bolt 2 is tightened, thus holding it firmly in position. Then by means of the crank $c$ the saws and their connections are lowered to the proper depth, and the board B is run directly from the planer under the saws $s$, and power being applied the saws will revolve, and a dovetailed groove will be cut in the central portion of the board on one side to the desired depth, as shown in Fig. 1.

Instead of the saws $s$, any revolving head which will cut away the woody material may be used, and the machine may be adapted by the use of such a revolving head to other purposes than cutting a groove in the sheathing-board; and I do not intend to limit myself to its use in the manufacture of sheathing or with saws.

I am aware that machines for cutting grooves in boards are not new, and do not broadly claim the same in this application; but I am not aware that any machine has heretofore been known or used in which saws have been set at angles crossing each other, as herein described, or that any such mechanism has been made adjustable both horizontally and vertically, as herein shown.

What I claim as my invention, and desire to secure by Letters Patent, is the following:

1. The frame $f$, carrying the horizontal shaft $s'$, the cross-piece $f''$, threaded to receive the screw-rods $sc$ on either end, the geared wheels $g'$ $g^2$, mounted so as to engage with each other and operate the screw-rods $sc$ when the shaft $s'$ is revolved, whereby the cross-piece $f'$ and the mechanism connected therewith may be raised and lowered in a vertical plane, the mandrels $m$, inclined toward each other and adjustably connected to such central cross-piece by means of a screw, 2, operating in a slot, 1, all combined substantially as described.

2. The mandrels $m$, having boxing $b$, the sleeve $l$, inclosing such boxing, the driving-pulley $p$, mounted upon the upper end thereof, the saws $s$, mounted on the lower end thereof and adjustably connected with the cross-piece $f'$, in combination with a similar mandrel mounted upon the opposite end of the same cross-piece and also adjustable, the frame $f$, and mechanism for lowering and raising the cross-piece $f'$ in a vertical plane, all combined substantially as described.

3. The frame-work $f$, provided with bearings for the shaft $s'$, upon which is mounted the gear-wheels $g'$, meshing with the gear-wheels $g^2$, secured to the upper end of the vertical rods $sc$, the cross-piece $f'$, carrying the mandrels $m$, inclined toward each other, the mandrel and cross-piece having a movement in a vertical plane and operated by the screw-rods $sc$, the mandrel connected with such cross-piece, so as to be adjustable thereon in the line of its length, the screw-rods $r$, working in the neck of such mandrels to regulate such adjustment, all combined substantially as described.

In witness whereof I have hereunto set my hand this 5th day of August, 1885.

EDWIN M. BYRKIT.

Witnesses:
WM. E. BARTON,
C. P. JACOBS.